US012064654B2

(12) United States Patent
Garden

(10) Patent No.: US 12,064,654 B2
(45) Date of Patent: Aug. 20, 2024

(54) DELUGE SYSTEM

(71) Applicant: Rig Deluge Global Limited, Aberdeen (GB)

(72) Inventor: Ian Garden, Alford (GB)

(73) Assignee: Rig Deluge Global Limited, Aberdeen (GB)

( * ) Notice: Subject to any disclaimer, the term of this patent is extended or adjusted under 35 U.S.C. 154(b) by 0 days.

(21) Appl. No.: 17/104,729

(22) Filed: Nov. 25, 2020

(65) Prior Publication Data

US 2022/0347502 A1 Nov. 3, 2022

Related U.S. Application Data

(62) Division of application No. 14/413,273, filed as application No. PCT/GB2013/005181 on Jul. 9, 2013, now Pat. No. 10,874,888.

(30) Foreign Application Priority Data

Jul. 9, 2012 (GB) ..................................... 1212200
Aug. 29, 2012 (GB) ..................................... 1215324

(51) Int. Cl.
*A62C 2/08* (2006.01)
*A62C 3/02* (2006.01)
(Continued)

(52) U.S. Cl.
CPC .............. *A62C 2/08* (2013.01); *A62C 3/0264* (2013.01); *A62C 31/24* (2013.01); *B05B 15/62* (2018.02); *B05B 15/68* (2018.02)

(58) Field of Classification Search
CPC ......... A62C 2/08; A62C 3/0264; A62C 31/24; B05B 15/62; B05B 15/68; E21B 41/0071;
(Continued)

(56) References Cited

U.S. PATENT DOCUMENTS 317,899 A 5/1885 Ward
440,827 A 11/1890 Hoffman
(Continued)

FOREIGN PATENT DOCUMENTS

CN 201593420 U 9/2010
CN 202036717 U 11/2011
(Continued)

OTHER PUBLICATIONS

Official Search Report dated Jun. 27, 2014 from corresponding European Application No. GB1408676.3.
(Continued)

*Primary Examiner* — Steven M Cernoch
(74) *Attorney, Agent, or Firm* — Dorton & Willis LLP; Ryan Willis

(57) ABSTRACT

A method of providing a deluge system (10) on a boom (12) such as a boom that is used to conduct well flaring operations at an end thereof. The deluge system comprises a base unit (30), a stanchion (20), and a nozzle apparatus (22); the method comprising attaching the deluge system to a burner boom with a walkway, such that there remains a width of at least 30 cm clear passage on the boom's walkway after the deluge system has been attached. This provides an escape and/or rescue route for personnel should a dangerous situation occur, such as uncontrolled fire or personnel falling overboard. In preferred embodiments, the deluge system is attached to the boom outboard of handrail supports (which includes on a single handrail). The deluge system may have its own mechanism e.g. a winch, for moving the stanchion from a stowed position to an operative position which allows a safe and more optimum positioning of the stanchion away from the well flaring operation, as herein described. In a preferred embodiment, the stanchion is provided as part of a moveable member which is rotationally attached to a
(Continued)

connection mechanism of the base unit at a connection point spaced away from an end of the moveable member. This allows the moveable member to have a counter weight system and reduces the amount of force required to move the moveable member, avoiding mechanical constraints.

8 Claims, 19 Drawing Sheets

(51) Int. Cl.
*A62C 31/24* (2006.01)
*B05B 15/62* (2018.01)
*B05B 15/68* (2018.01)

(58) Field of Classification Search
CPC .......... F23D 11/104; F23G 7/05; E23B 35/00; E23B 41/0021
See application file for complete search history.

(56) References Cited

U.S. PATENT DOCUMENTS

| | | | | |
|---|---|---|---|---|
| 451,708 | A | 5/1891 | Crafts | |
| 483,001 | A | 9/1892 | Hughes | |
| 517,320 | A | 3/1894 | Alexander | |
| 589,244 | A | 8/1897 | Cantore | |
| 640,645 | A | 1/1900 | Fall | |
| 1,074,165 | A | 9/1913 | Coutu | |
| 1,090,222 | A | 3/1914 | Mcmane et al. | |
| 1,583,772 | A | 5/1926 | Blaw | |
| 1,589,351 | A | 6/1926 | Blaw | |
| 2,265,063 | A | 12/1941 | Crumly | |
| 2,593,921 | A | 4/1952 | Robinson | |
| 3,010,533 | A | 11/1961 | Ross | |
| 3,807,932 | A | 4/1974 | Dewald | |
| 4,253,607 | A | 3/1981 | Gerard, Sr. | |
| 4,776,403 | A | 10/1988 | Lejosne | |
| 5,301,756 | A | 4/1994 | Relyea et al. | |
| 5,488,995 | A * | 2/1996 | Kuwahara .............. | A62C 27/00 180/234 |
| 6,340,060 | B1 | 1/2002 | Larsson et al. | |
| 2004/0255377 | A1 | 12/2004 | Mueller et al. | |
| 2006/0054716 | A1 | 3/2006 | Lutzki | |
| 2008/0083839 | A1 | 4/2008 | Altaii | |
| 2010/0065698 | A1 | 3/2010 | Paulig et al. | |
| 2010/0252284 | A1 | 10/2010 | Johansen | |

FOREIGN PATENT DOCUMENTS

| | | | |
|---|---|---|---|
| CN | 201380046166.0 | | 1/2017 |
| EA | 201590180 | | 2/2017 |
| FR | 2804033 | A1 | 7/2001 |
| GB | 1472871 | A | 5/1977 |
| GB | 1521307 | A | 8/1978 |
| GB | 2098959 | A | 12/1982 |
| GB | 2099397 | A | 12/1982 |
| GB | 2433710 | A | 7/2007 |
| GB | 2441058 | A | 2/2008 |
| GB | 2458740 | A | 10/2009 |
| GB | 1215324.3 | | 10/2012 |
| JP | S5030129 | A | 3/1975 |
| JP | S62115500 | U | 7/1987 |
| JP | H0614220 | U | 2/1994 |
| JP | 2003062105 | A | 3/2003 |
| JP | 2015521060 | | 7/2017 |
| KR | 20130033002 | A | 4/2013 |
| WO | 2005084815 | A2 | 9/2005 |

OTHER PUBLICATIONS

Official Search Report dated Oct. 19, 2012 from corresponding European Application No. GB1212200.8.
Official WIPO International Search Report dated Feb. 13, 2014 from corresponding PCT Application No. PCT/GB2013/051810.
Gost 27372-87 Cradles for Construction and Installation Works-Technical Conditions; Jan. 1, 1989; 7 pages.
United Arab Emirates Patent Application 0036/2015, Examination Report dated Jan. 2019; 7 pages.
Mexican Patent Application 2015/000376, Office Action dated Jan. 10, 2019; 5 pages.
Eurasian Patent Application 201590180, Office Action dated Mar. 15, 2019; 4 pages.
European Patent Application 13750358.7, Examination Report dated Nov. 8, 2019; 6 pages.
Opposition against European Patent No. EP2869937 in the name of Rigdeluge Global Limited, submitted Sep. 30, 2020.
RigCool Limited, Heat Suppression Safety System Rig Survey Report, having a document No. of UK12012-RS-0001, having an unverified dissemination date of Feb. 2, 2012.
RigCool Australia Pty Ltd, Heat Suppression Safety System Boom System Installation Procedures, having a document number of OP003, having an unverified dissemination date of Mar. 24, 2011.
Photograph 1, having and unknown date.
Photograph 2, having and unknown date.
Photograph 3, having and unknown date.
Photograph 4, having and unknown date.
RigCool Pre-Flaring Safety Video Part 2, RigCool Video https://www.youtube.com/watch?v=RSc_XUJPG-A (Year: 2009).

* cited by examiner

DELUGE SYSTEM

CROSS REFERENCE TO RELATED APPLICATIONS

This application is a divisional of U.S. patent application Ser. No. 14/413,273, filed on Jan. 7, 2015 and titled “Deluge System,” which was a national stage application of Patent Cooperation Treaty Application Serial No. PCT/GB2013/051810, filed Jul. 9, 2013, titled “Deluge System,” which claimed priority under 35 U.S.C. § 119 to United Kingdom Patent Application Serial No. 1212200.8, filed on Jul. 9, 2012, and to United Kingdom Patent Application Serial No. 1215324.3, filed Aug. 29, 2012, the disclosure of each of the foregoing applications is hereby incorporated by reference.

This invention relates to a deluge system utilised to create a water barrier especially between a well test flare and personnel and/or structures such as oil rigs.

When testing a well it is a common operation to flare the oil and gas from the well. This normally involves piping the oil and gas through pipework provided on a burner boom extending away from the installation. The oil and gas is flared whilst the well is being tested and data is being recovered.

The heat created by the flaring can cause discomfort to workers on the installation, and in some cases can cause severe burns and injury. Other heat sources may also cause discomfort or danger. For example well blow-outs, or bush-fires. Accordingly it is known to provide a deluge system comprising a screen of water which is sprayed between the flame and the installation or other area where workers are present.

The inventor of the present invention has noted a number of limitations of existing deluge systems. The boom walkway is blocked which prevents a safe escape should a fault occur or if an accident happens at the burner end of the boom the emergency crew has no direct access to and from the end point. Moreover, the nozzles in the spraying system become blocked due to corrosion in the pipework causing scale to break off and block them. Furthermore, the inventor of the present invention considers that the assembly of the necessary equipment could be achieved in a more straightforward manner and/or in a reduced time.

According to a first aspect of the present invention there is provided a deluge system comprising a base unit, a stanchion moveably attached to the base unit, a nozzle apparatus attached to the stanchion and a mechanism for moving the stanchion from a stowed position to an operative position.

The mechanism for moving the stanchion may be a winch mechanism.

Alternatively a gear mechanism may be provided and a worker can use this to move the stanchion, for example by way of a suitable handle.

Certain other parts of the deluge system may move with the stanchion e.g. nozzle apparatus whilst others remains stationary, with the moving mechanism e.g. the base unit.

According to a second aspect of the invention there is provided a deluge system comprising a base unit, a stanchion moveably attached to the base unit such that it can move from a stowed position to an operative position, and a nozzle apparatus attached to the stanchion,
wherein the base unit's width perpendicular to the plane defined by the movement of the stanchion, is less than 1 m.

Since the base unit is off such a size, it can be attached to a boom without impeding the escape of a person on its walkway. Its width may be smaller than 75 cm or smaller than 60 cm.

The invention in a third aspect, also provides a method of:

- providing a deluge system comprising a base unit, a stanchion, and a nozzle apparatus;
- attaching the deluge system to a burner boom with a walkway, such that there remains a width of at least 30 cm clear on the boom's walkway after the deluge system has been attached.

Thus by leaving such a passage/space, a person can escape from the walkway in the event of an emergency. The space may be larger than 50 cm or larger than 65 cm or indeed completely clear for example if fixed on the outside.

Having a space on the width of the walkway means that a person can walk past the deluge system after it has been installed without having to crawl under or climb over any of its parts.

The deluge system may be placed over pipework on the boom.

For certain embodiments, the deluge system is attached to the boom outboard of handrail supports of the boom.

The invention in a fourth aspect, also provides a method of

- providing a deluge system comprising a base unit, a stanchion, and a nozzle apparatus;
- attaching the deluge system to a burner boom with a walkway, outboard of the handrail supports of the boom.

Thus since the deluge system is attached in this position, the boom walkway is not impeded by the deluge system. For example it may be provided outboard of one of the handrail supports on the boom walkway.

The deluge system normally comprises clamps and is normally clamped to the boom when in the stowed and operative position.

The deluge system may be attached to a hand rail support of the boom.

Preferably the deluge system used less than half the boom walkway width.

The deluge system may comprise a filter between the inlet and the outlet to the stanchion and a first flow path may be defined for particles too large for said filter and a second flow path is defined for particles small enough for said filter; and wherein a container is provided downstream of the first flow path.

The filter may be a screen comprising at least one aperture therein such that the first flow path is for particles too large for said aperture and the second flow path is for particles small enough for said aperture.

Normally the deluge system comprises a removable portion to allow access to the container. This may be provided by the container itself, or part thereof, being removable.

The container is normally at least 20 $cm^3$ optionally more than 50 $cm^3$ optionally more than 100 $cm^3$.

Preferably the first flow path terminates in the container. Thus aside from its direct fluid connection with the first flow path, preferably the container has no further direct (i.e. not through the first flow path) fluid communication with any other flow path of the deluge system.

The removable portion is most normally a portion which can readily be reattached to the deluge system. Thus the removable portion may be removable by way of any one or more of a threaded connection, a snap fit connection, springs, clips, bolt & screw or others such mechanisms.

The removable portion may be the container, which may be threadably connected with another portion of the deluge system, such as the screen.

The aperture is preferably linear in shape—one dimension is larger than a second dimension, with the third dimension being defined as the depth of the aperture. For example the first dimension may be more than 3, or more than 8, times the length of the second dimension.

The screen is normally a tubular screen with a passage therein, and said at least one aperture thereon is on a face (rather than an end) of the tubular screen. Thus the second flow path may be from/to the passage of the tube to/from the outside of the screen; preferably from the passage of the tube, to the outside of the screen.

The portion of the deluge system between the inlet and the screen will be referred to as the "inlet flow path" and the portion of the deluge system between the screen and the outlet will be referred to as the "outlet flow path".

The inlet flow path may be a relatively central portion of the deluge system compared to the outlet flow path although this depends on the actual water pattern required.

The inlet flow path and the first flow path are preferably co-linear. This allows certain embodiments to create a flow pressure to encourage the debris to accumulate in the end of the first flow path, which terminates in the container.

There may be a further container co-linear with the stanchion.

Depending on the amount of fluid required, the deluge system may also use the installations own pumps without requiring a dedicated pumping unit.

According to a sixth aspect of the present invention there is provided a deluge system comprising:

- a moveable member comprising a stanchion, the stanchion having an internal fluid channel and being suitable to attach a nozzle apparatus thereto;
- a connection mechanism, wherein the moveable member is rotationally attached to the connection mechanism at a connection point spaced away from the end of the moveable member.

According to a seventh aspect of the present invention, there is provided a use of the deluge system as described herein to provide a fluid screen to mitigate heat transfer. This is especially applicable during well testing, often on offshore platforms.

Since the moveable member is connected to the connection mechanism at a point spaced away from the end of the moveable member, one end of the moveable member acts as a counterweight to the other end of the moveable member. Thus in use when installing the moveable member and so moving it typically from a horizontal position to a generally vertical position, the amount of force required to move towards an erect vertical position is less.

Being "spaced away from the end of the moveable member" means being spaced away by at least 5% of the moveable member's length (without nozzle apparatus) from its end. Certain embodiments are spaced away further, such as by at least 10% or at least 20% or at least 30% optionally more than 40%. The point may be spaced away by 50% (i.e. be in the middle of the moveable member's length).

The connection point is however often less than 50% of the moveable member's length, optionally less than 40%. In particularly preferred embodiments the connection point around which the moveable member rotates, or part-rotates may be spaced away from the end of the moveable member by 25-35% of the moveable member's length.

Normally the end from which the connection point is spaced away, for example by 25-35% of its length, is the end opposite the end suitable to receive the nozzle apparatus.

Thus, before use, a nozzle apparatus is typically attached to the stanchion and this may be fitted shortly before erection of the moveable member. This is typically fitted towards one end of the stanchion, indeed normally at the end of the stanchion and normally at the end further away from the connection point. The nozzle apparatus is normally in fluid communication with the fluid channel of the stanchion and fluid directed through the stanchion proceed through the nozzle apparatus and creates a water screen which mitigates heat transfer.

Thus the moveable member in use has a nozzle end between the connection point and towards the nozzle; and an opposite counterweight end, between the connection point and towards the opposite end.

Additional weight may be added to the counterweight end. Clearly there is a pay-off between the amount of weight required and the position of the connection point. Moreover, the length of the moveable member also affects the amount of weight required. Nevertheless, embodiments of the invention often have between 50-300 kg, optionally 100-200 kg of weight between the connection point and the counterweight end of the moveable member.

Normally less than 50% of the weight of the moveable member (including the nozzle apparatus) is at the counterweight end and more than 50% of the weight of the moveable member (including the nozzle apparatus) at the nozzle end. In this way, the system is biased to remain in a stowed, often horizontal, position.

However, preferably at least 20% of the weight, optionally more than 30%, perhaps more than 40% of the weight of the moveable member and attached nozzle apparatus are at the counterweight end; generally with a preferred maximum of 49% of the weight at this counterweight end.

Thus, for certain embodiments, the force required to overcome the normally slight bias towards the nozzle end, is much less than conventional systems, where the entire weight of the moveable member must be lifted. When used on an offshore installation, use of the platform's own winch may not therefore be required.

For such embodiments, benefits ensue. Traditionally, the platform's crane needs to raise the system and typically position a 4" flange to another 4" flange while lifting the assembly over the boom and above workers who must guide the assembly down and connect it. This is a very dangerous activity which embodiments of the present invention can avoid or mitigate.

Moreover, given the crane on the platform can only pull towards the platform, earlier deluge systems need to be orientated so that their moveable member moves upwards towards the platform. For larger stanchions the resulting operational position is often spaced away from the well flaring by a greater distance than desired. In contrast, the embodiments of the present invention which do not require the platforms own crane or winch, can move upwards away from the platform and so their final operational position allows the water screen operation to be optimally positioned from the well flaring.

In any case, embodiments obviate the need to employ the crane's winch (or indeed any winch) and so make installation quicker and easier.

The moveable member may be arranged to rotate by at least 45 normally at least 89 degrees. Indeed preferred embodiments can rotate by more than 90 degrees, to over 170 degrees. Thus they may move from one stowed position, normally generally in line with the boom, to a position at 90 degrees to this, and then continue to a position at 180 degrees to the original stowed position. In this way such embodiments may be stowed on either side of the connection bracket, as required by the particular situation. Certain embodiments can rotate by more than 180 degrees, for example 270 degrees or full 360 degree rotation may be allowed. In this way, the moveable member can be rotated in either rotational direction in order to more from the stowed position to the operative position, and this may be useful for example when rotation in one direction is impeded.

Further, the moveable member may be rotationally mounted in a separate, normally horizontal, plane; normally at right angles to the plane defined by the movement of the moveable member between the stowed position and the operative position. Thus for example the movable member may be in a "transit" position where the nozzle end may be closer to the host facility, and then moved, 180 degrees, for example in a horizontal plane, to the stowed position so that the nozzle end is the distal end relative to the host facility. Thereafter, the moveable member may be moved in a separate plane, from this stowed position to the operative position.

The connection mechanism may be suitable for connection to a boom and in use may be connected to a boom, ideally outboard of handrail supports of the boom or at least preferably not blocking a walkway. An added benefit of such embodiments is that since the deluge system is attached in this position, access to the boom walkway is not impeded by the deluge system of such preferred embodiments.

The connection mechanism may be attached to a hand rail support of the boom, optionally via a frame. It may be provided internal or external of the walkway,
preferably not blocking the boom escape route.

The invention also provides, in an eighth aspect, a deluge system as described herein, the method including:

- creating a screen of water to mitigate heat transfer from a heat source.

The deluge system according to the present invention is normally for use to create a water or fluid screen to mitigate heat transfer from a well-testing operation, often but not always on an offshore platform. It may also be used for a land flaring operation. Moreover, in an alternative use, the deluge system may also be positioned on a portable unit for bushfires and forest fires where a truck can position the unit, for example, in front of a building beside a water source. In this way heat transfer may be mitigated which can for example protect people or livestock from potentially deadly heat affects, or protect property from catching fire.

As a further alternative, the deluge system can also be used for blow-out protection. For example where a blow-out has occurred from a hydrocarbon well, and expelled liquids or gases are on fire, the system may be provided to mitigate heat loss by providing a screen of fluid, often water, to mitigate heat transfer from the flaming blow-out.

Thus the present invention provides various methods for mitigating heat transfer from various sources such as offshore or land well testing, or from fires such as forest fires or blow-outs.

Embodiments of the present invention will now be described, by way of example only, with reference to the accompanying figures, in which:

FIG. 1 is a perspective view of a deluge system in an operative position on a flare boom in accordance with the present invention;

FIG. 2*a* is an end view of the FIG. 1 deluge system in an outboard operative position and a flare boom;

FIG. 2*b* is a top view of the FIG. 2*a* deluge system in an outboard stowed position and a flare boom;

FIG. 3 is a perspective view of the FIG. 2*b* deluge system in an outboard stowed position and a flare boom;

FIG. 4*a* is a top view of the FIG. 1 deluge system in an inboard stowed position and a flare boom;

FIG. 4*b* is an end view of the FIG. 4*a* deluge system in an inboard operative position and a flare boom;

FIG. 5*a* is a top view of the FIG. 1 deluge system in a further inboard stowed position and a flare boom;

FIG. 5*b* is an end view of the FIG. 5*a* deluge system in the further inboard and operative position and a flare boom;

Figure 1:
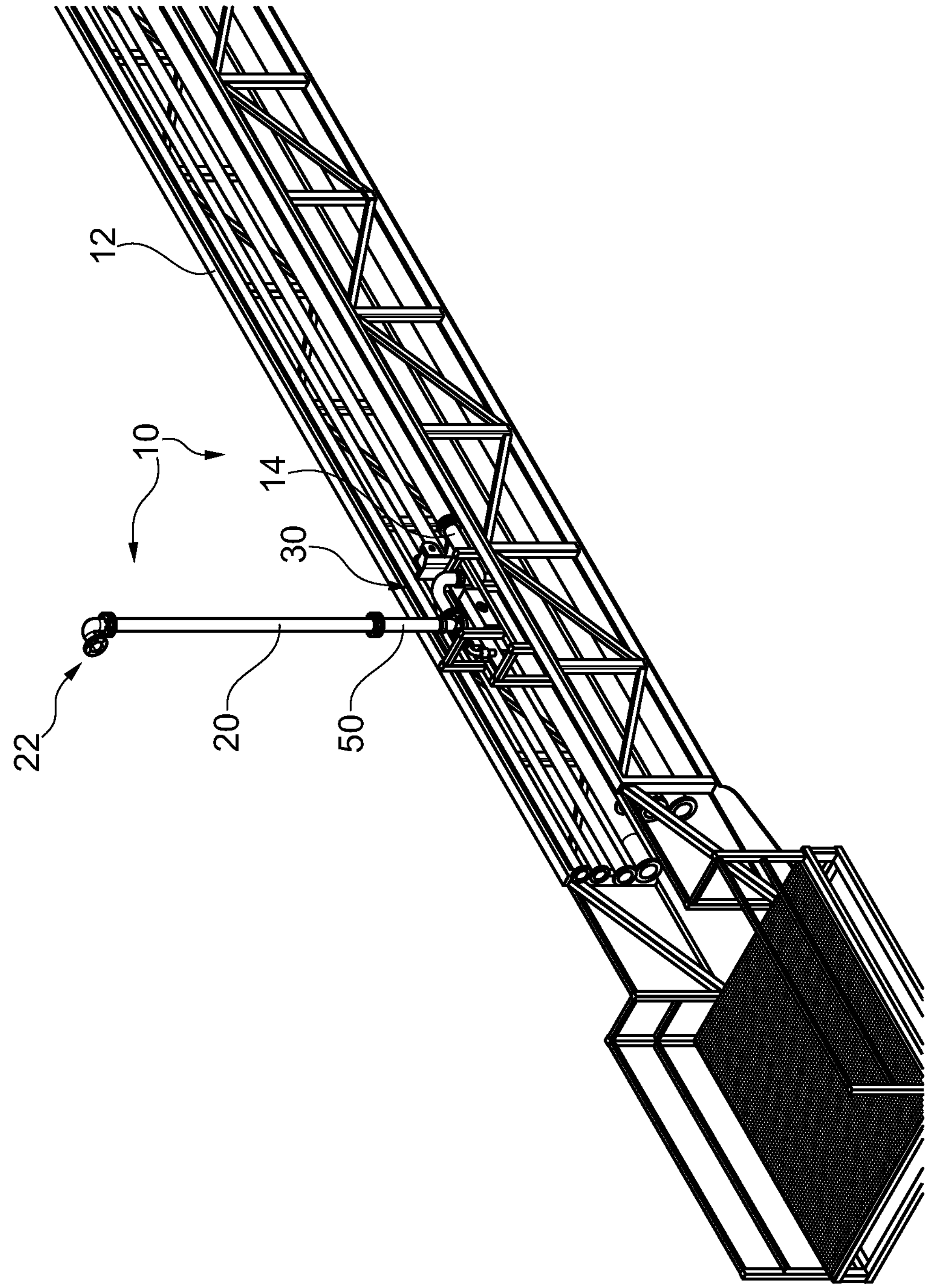
Figure 8C:
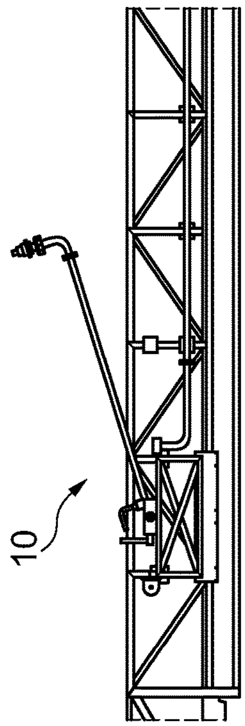
Figure 8D:
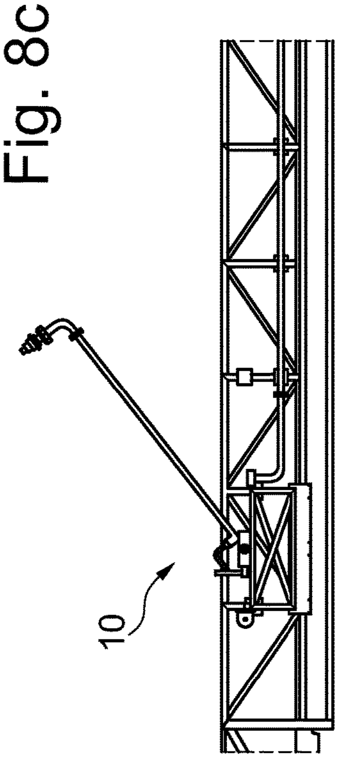
Figure 8E:
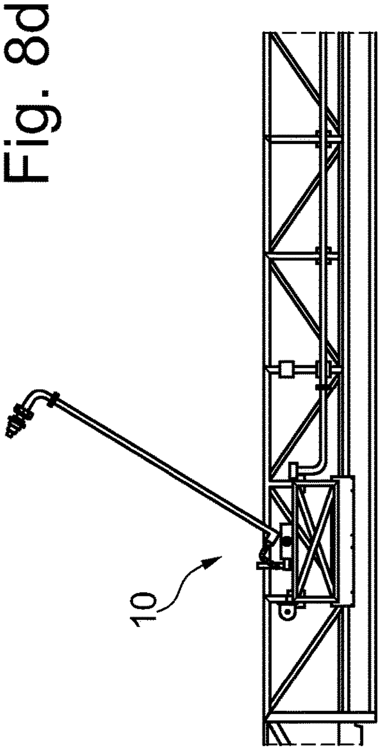
Figure 8A:
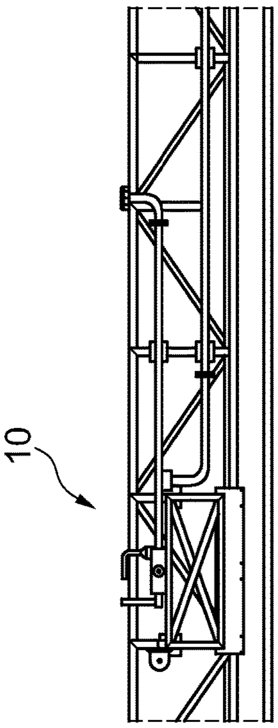
Figure 8B:
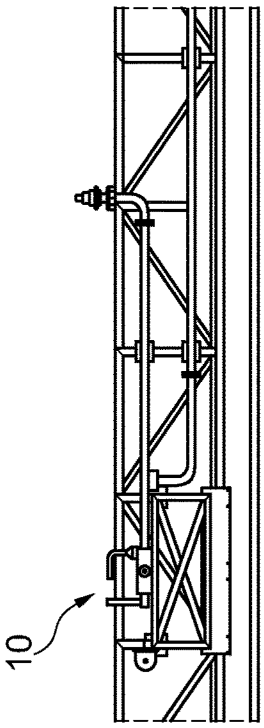
Figure 9:
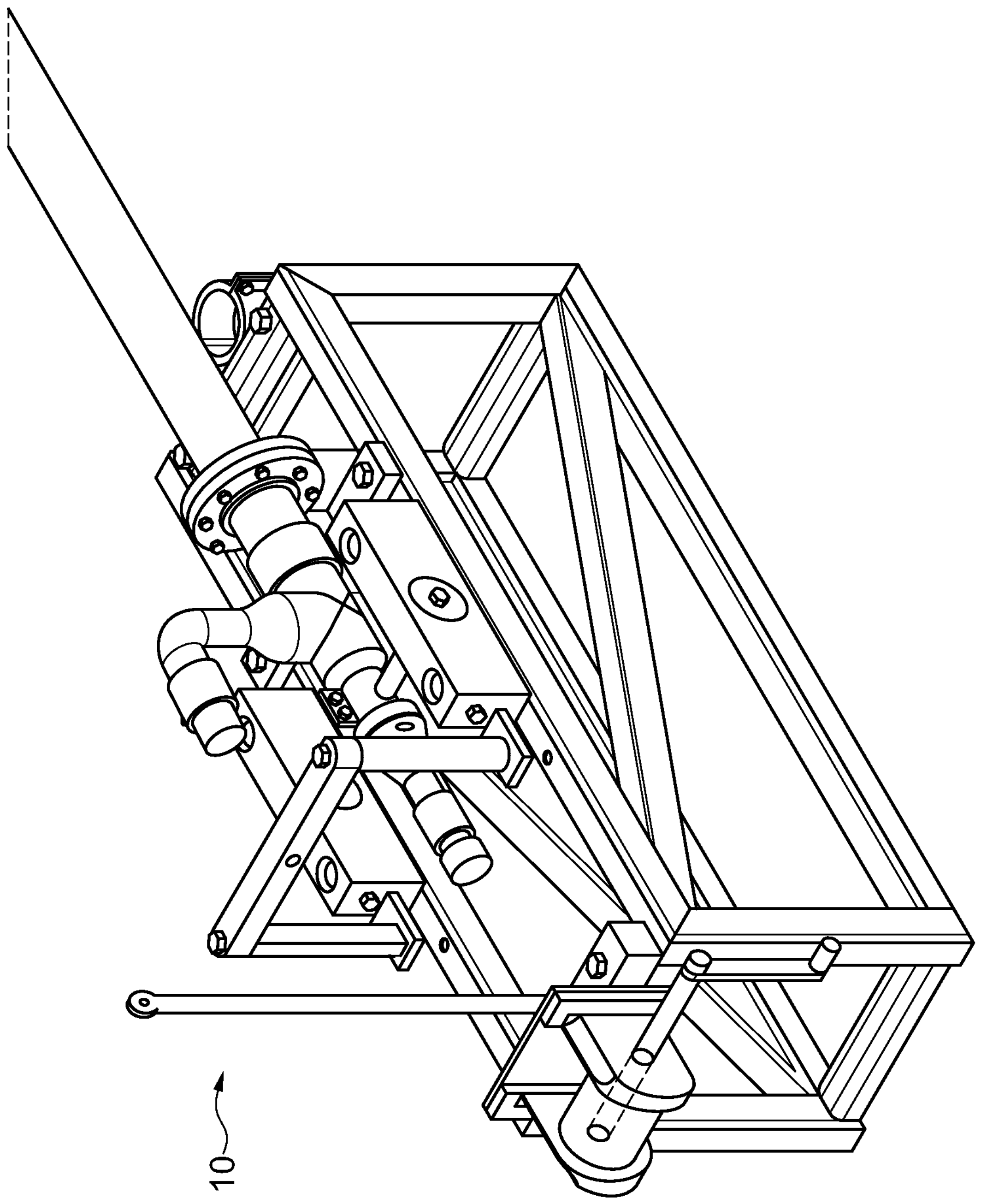
Figure 10:
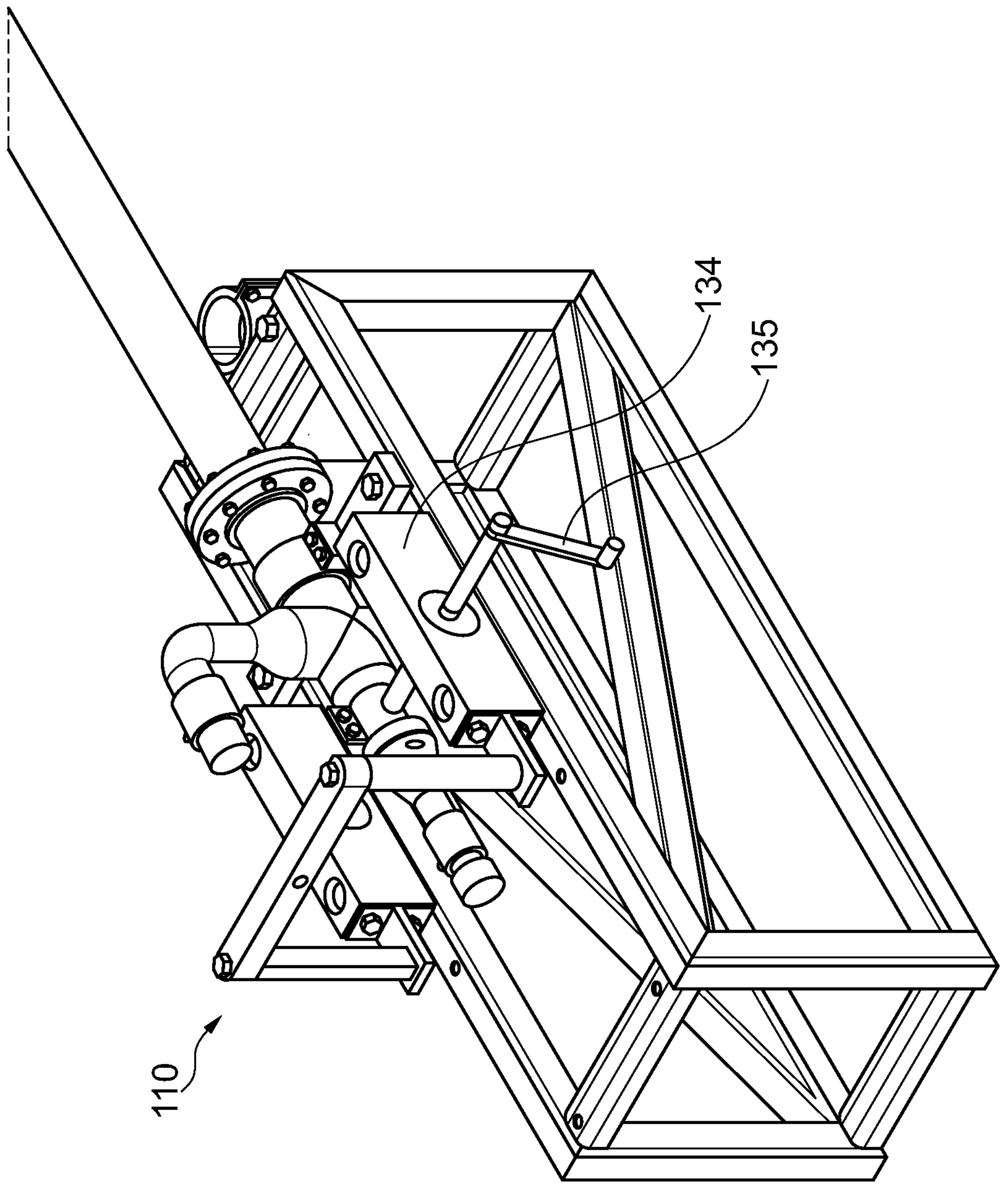

FIGS. 8*a*, 8*b* are side views of the FIG. 1 deluge system in a stowed position and a flare boom;

FIGS. 8*c*-8*e* are a series of side views of the FIG. 1 deluge system moving into the operative position and a flare boom;

FIG. 9 is a further perspective view of a deluge system in accordance with the present invention; and, FIG. 10 is a further perspective view of a different embodiment of a deluge system in accordance with the present invention.

Figure 11:
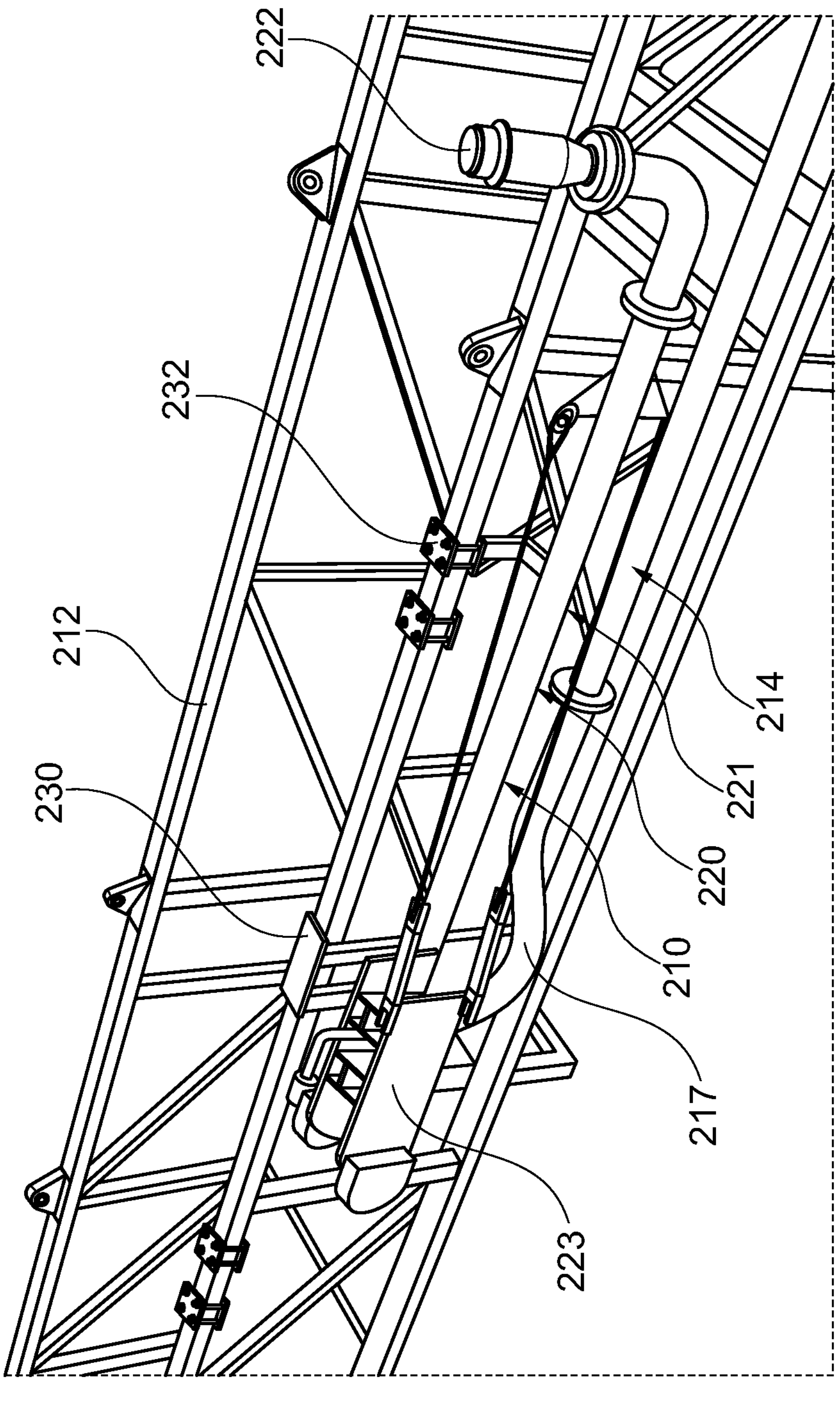
Figure 12:
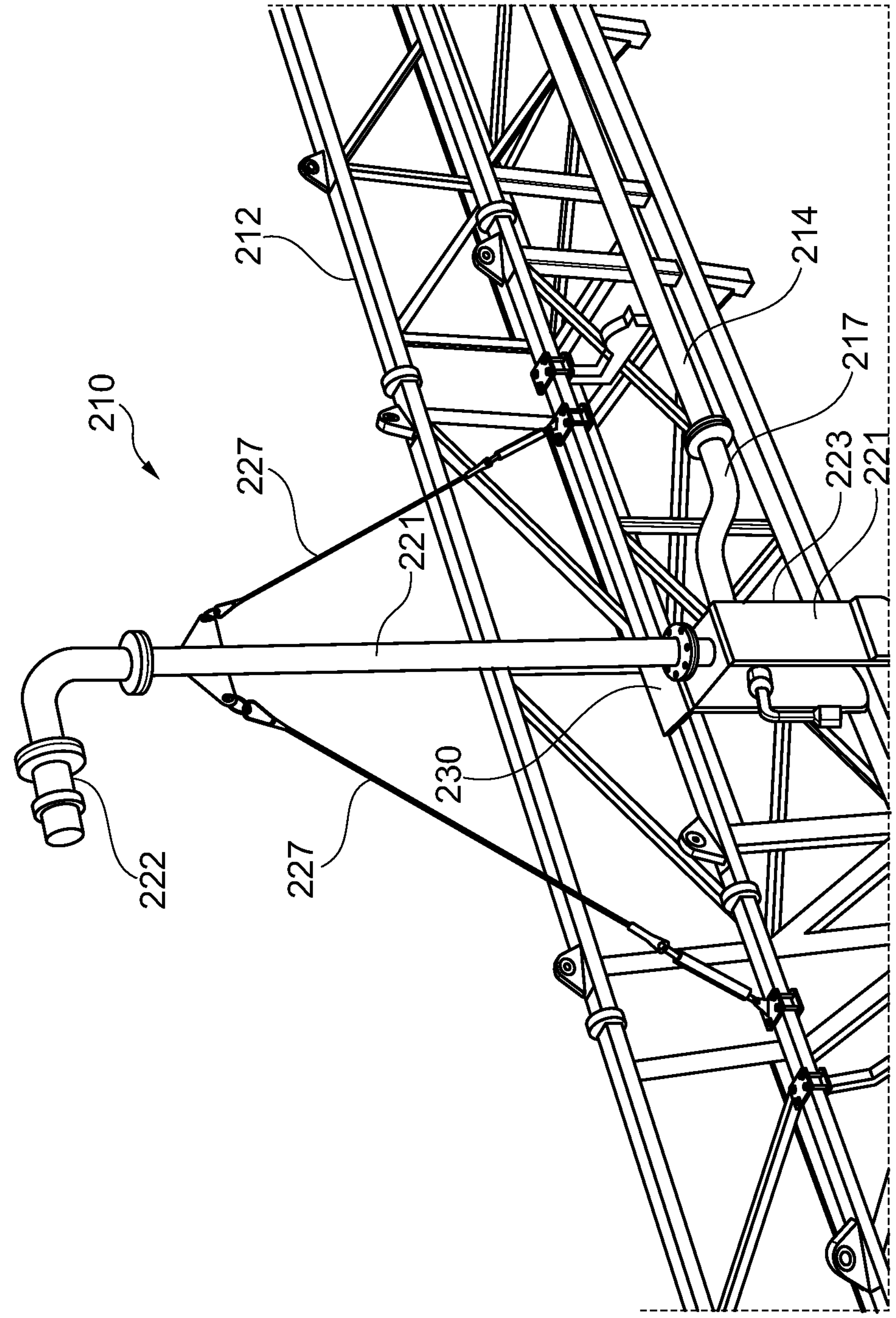
Figure 13:
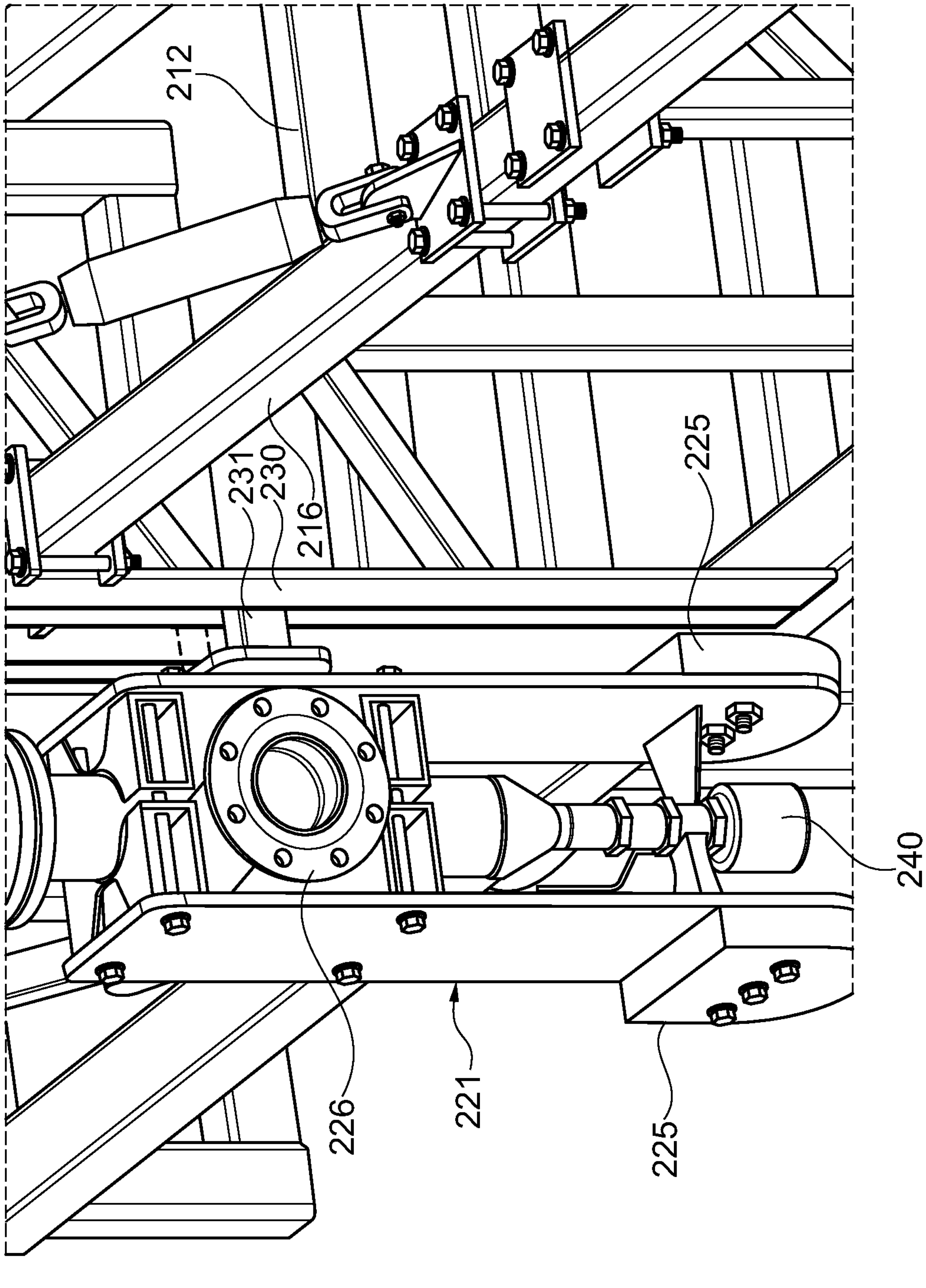
Figures 14A, 14B, 14C, 14D:
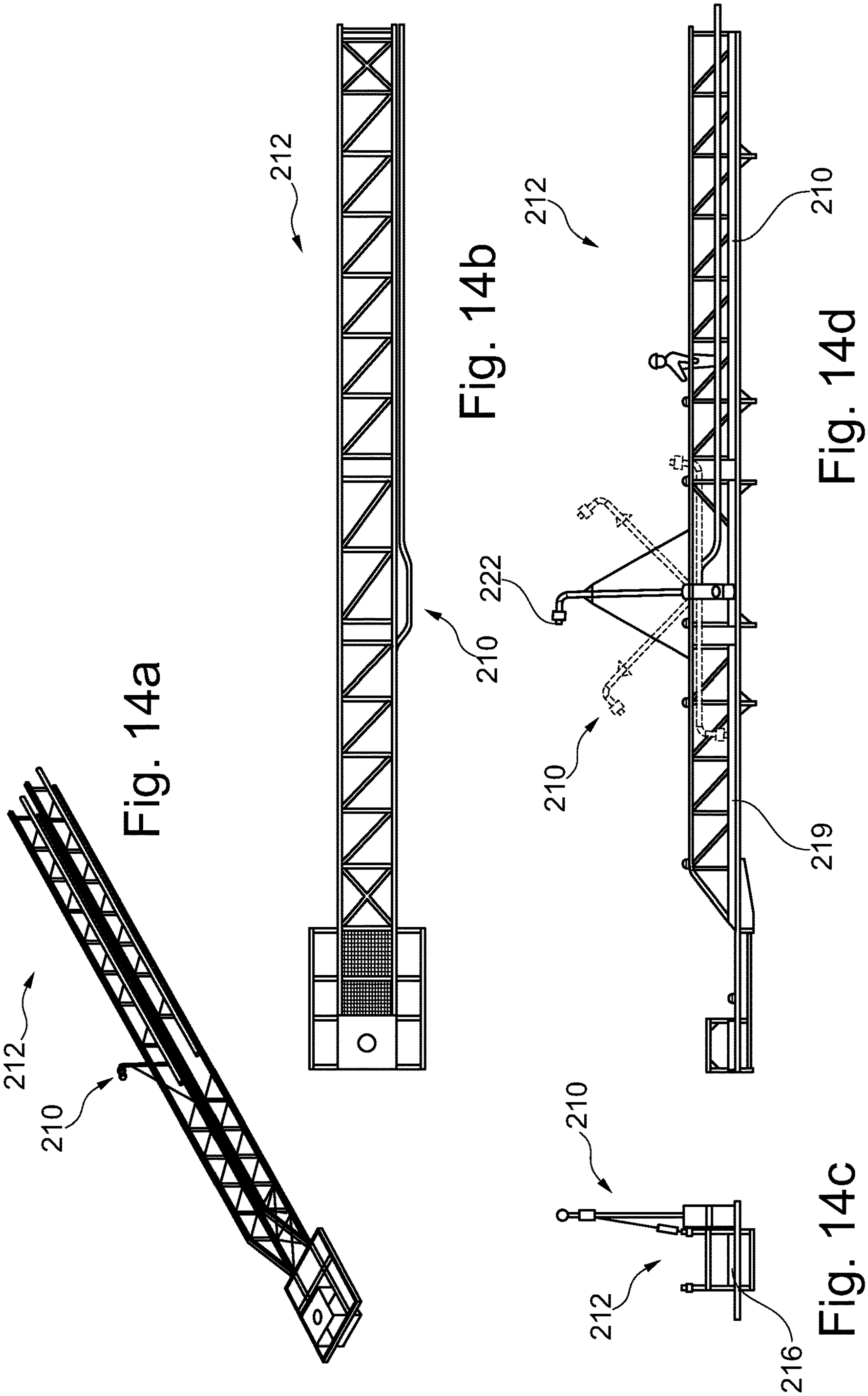
Figure 15:
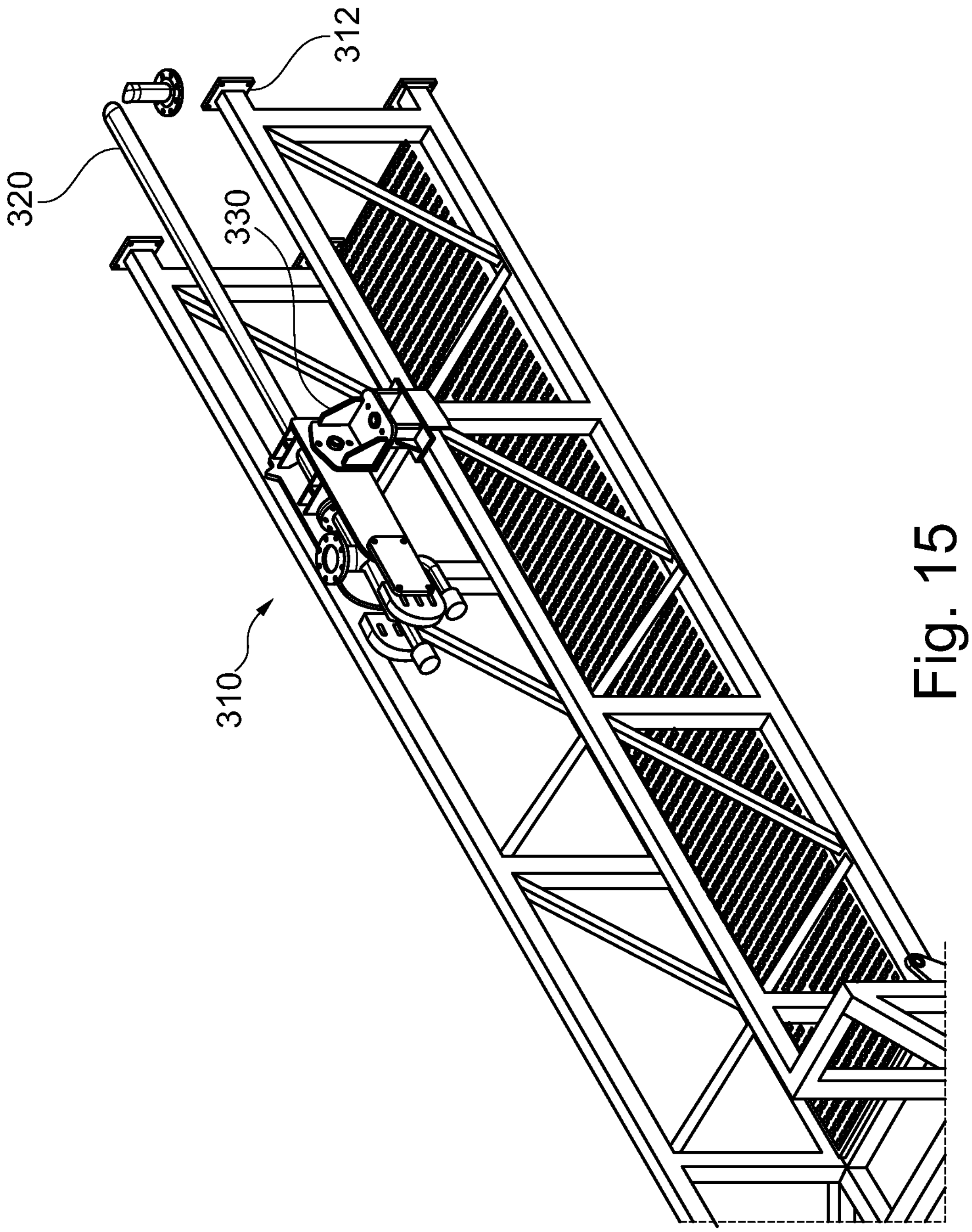
Figure 16:
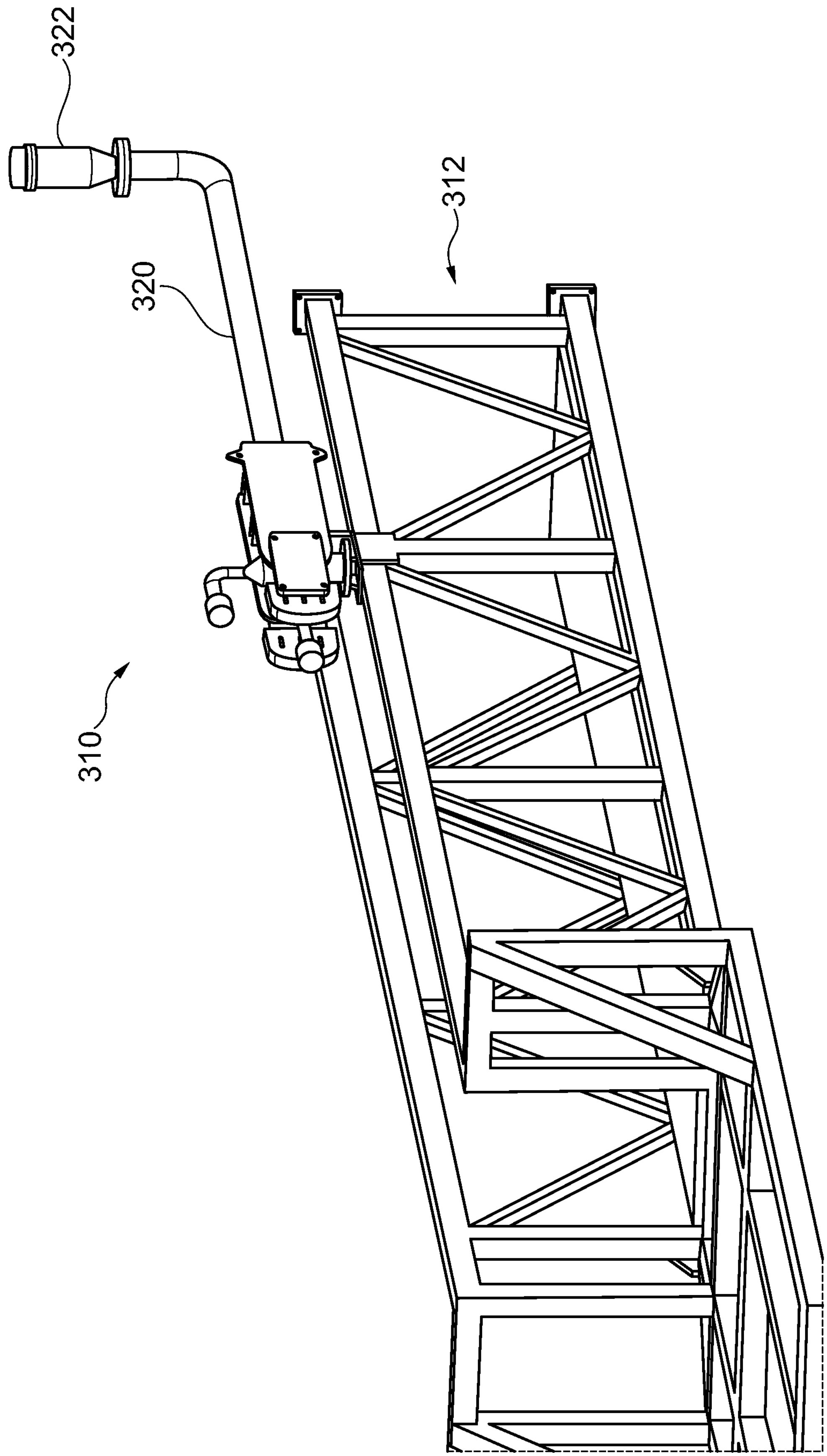
Figure 17:
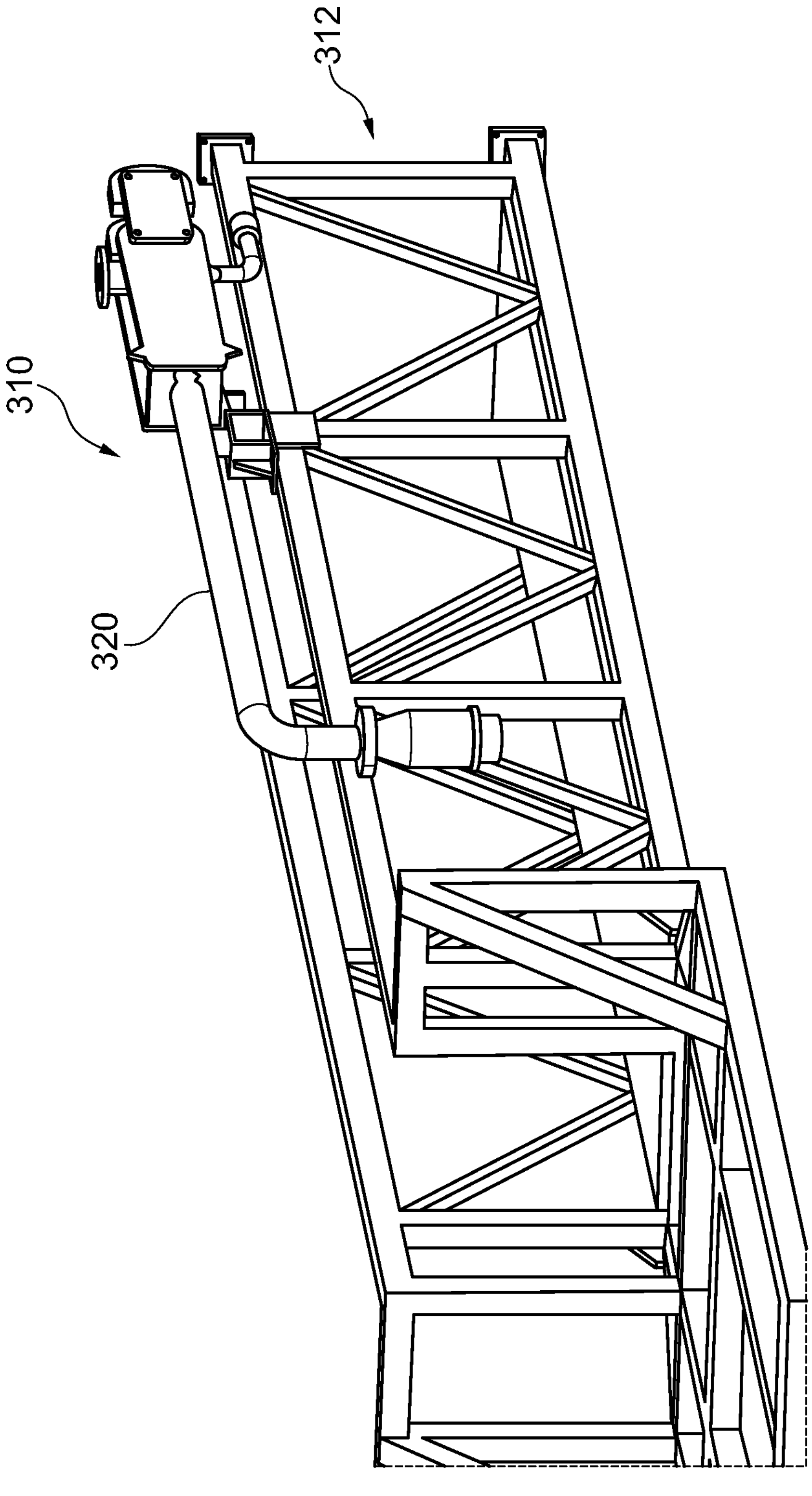
Figure 18:
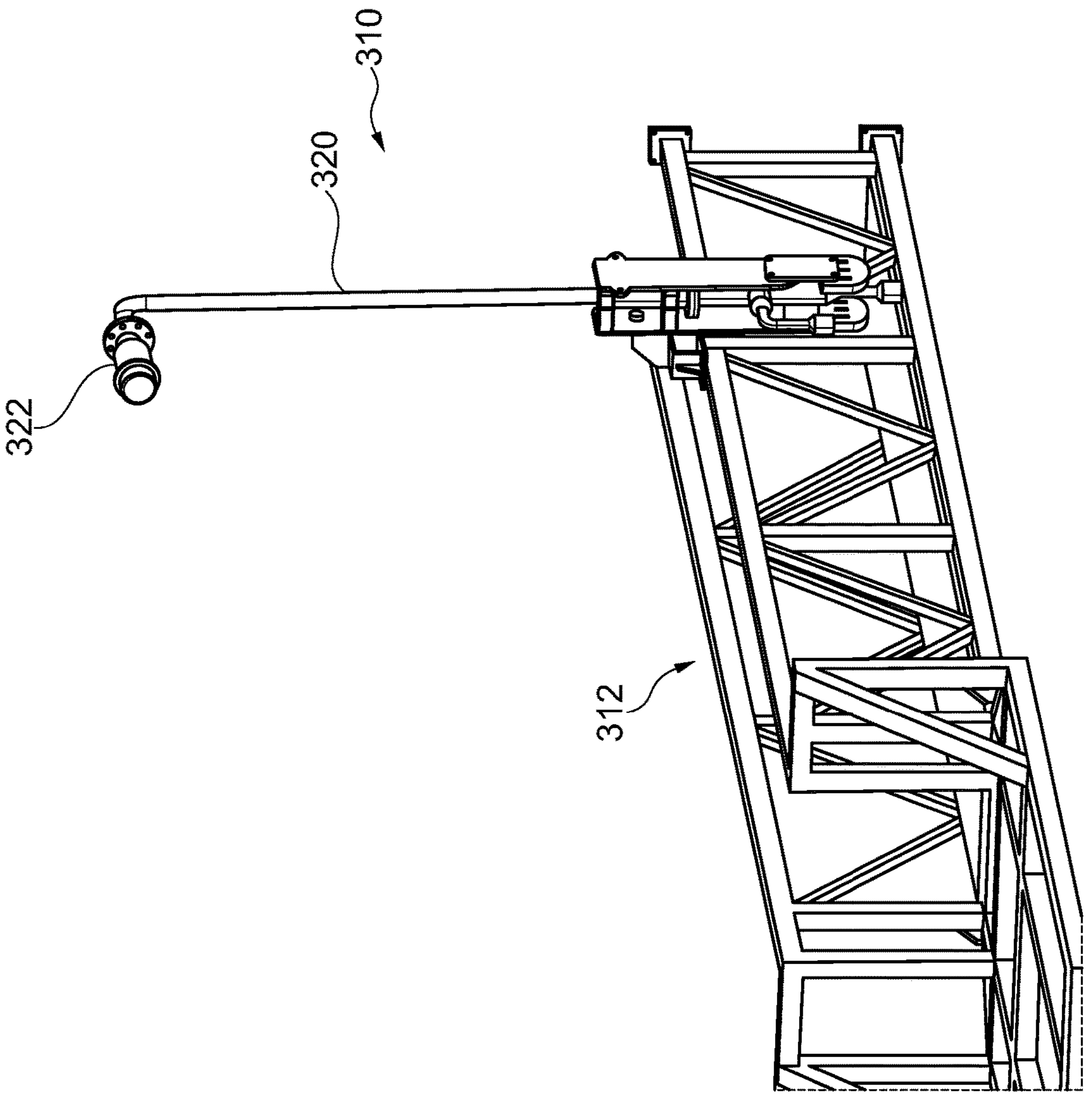
Figure 19:
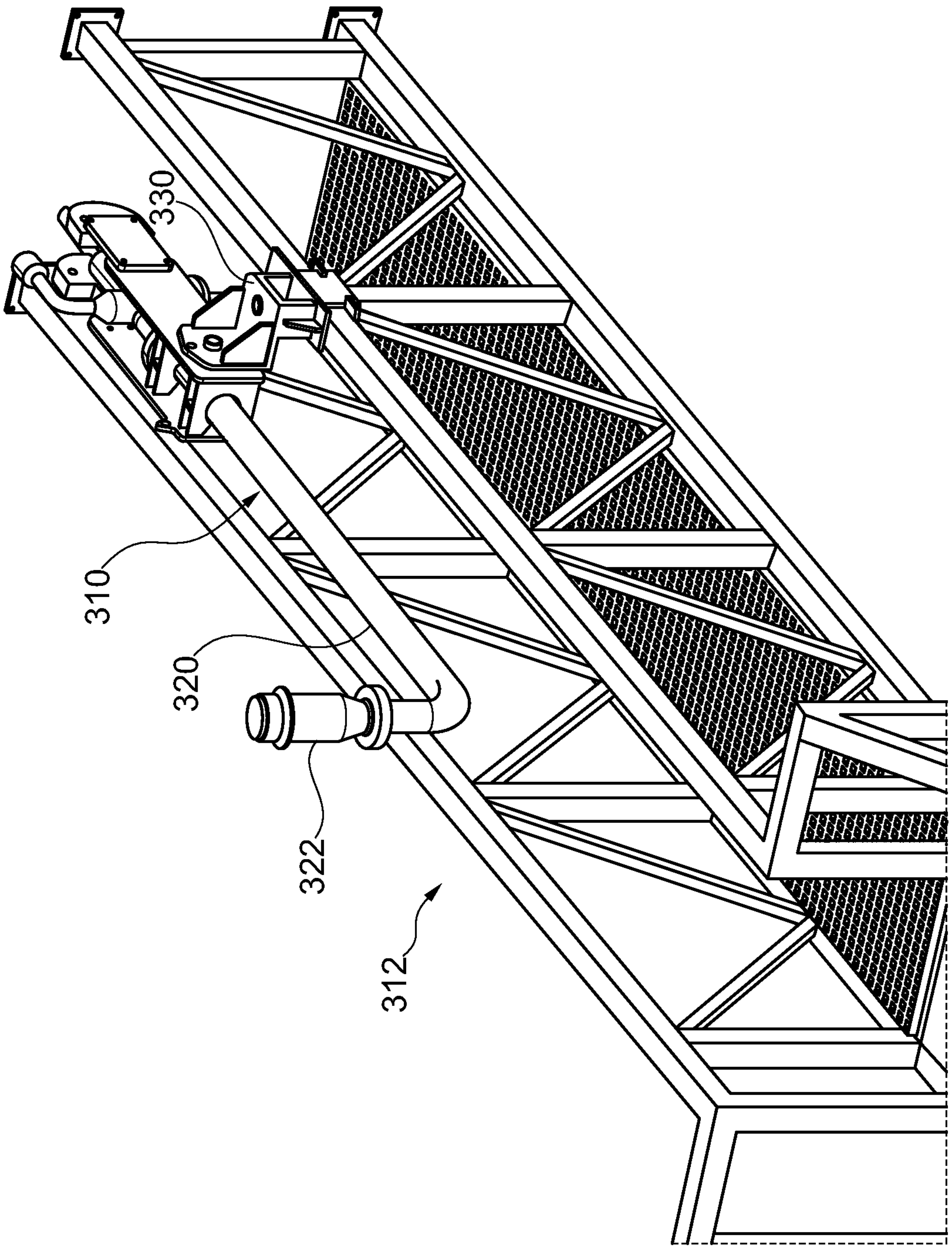

FIG. 11 is a perspective view of a deluge system in a stowed position on a flare boom in accordance with the present invention;

FIG. 12 is a perspective view of the FIG. 11 deluge system in an operative position;

FIG. 13 is an enlarged view of the FIG. 11 deluge system showing the connection mechanism and a connection point;

FIG. 14*a* is a perspective view of a boom and deluge system in accordance with the present invention;

FIG. 14*b* is a plan view of the FIG. 14*a* boom and deluge system;

FIG. 14*c* is an end view of the FIG. 14*a* boom and deluge system;

FIG. 14*d* is a side view of the FIG. 14*a* boom and deluge system;

FIG. 15 is a perspective view of a boom and another embodiment of the deluge system in accordance with the present invention; in a transit position;

FIG. 16 is a perspective view of the FIG. 15 deluge system in a stowed position, including nozzle apparatus;

FIG. 17 is a perspective view of the FIG. 16 deluge system and nozzle apparatus in further a stowed position;

FIG. 18 is a perspective view of the FIG. 16 deluge system and nozzle apparatus in an operative position;

FIG. 19 is a perspective view of the FIG. 16 deluge system and nozzle apparatus in further a servicing position.

FIG. 1 shows one embodiment of a deluge system 10 provided on a boom 12 of an offshore installation (not shown). The deluge system 10 comprises a base unit 30 having a main body 50 connected to a stanchion tube 20 and at the opposite end of the stanchion 20, a nozzle apparatus 22. The deluge system 10 takes water supplied by pumps (not shown) through pipework 14, through the stanchion 20 into the nozzle apparatus 22 to create a screen of water, thus mitigating the heat transfer from a well flaring operation at the end of the boom 12.

The position of the deluge system 10 may be secured to the boom 12 in various positions; but all positions for preferred embodiments leave the boom 12 and its walkway 16 free to walk on for personnel, who may need to run off the boom 12 in the event of an emergency.

Figure 2B:
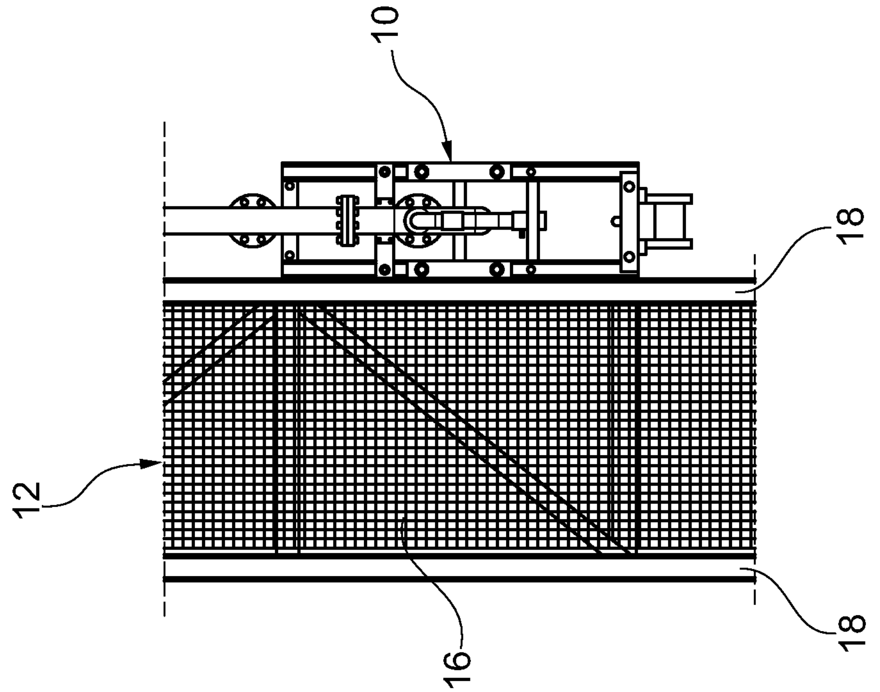
Figure 2A:
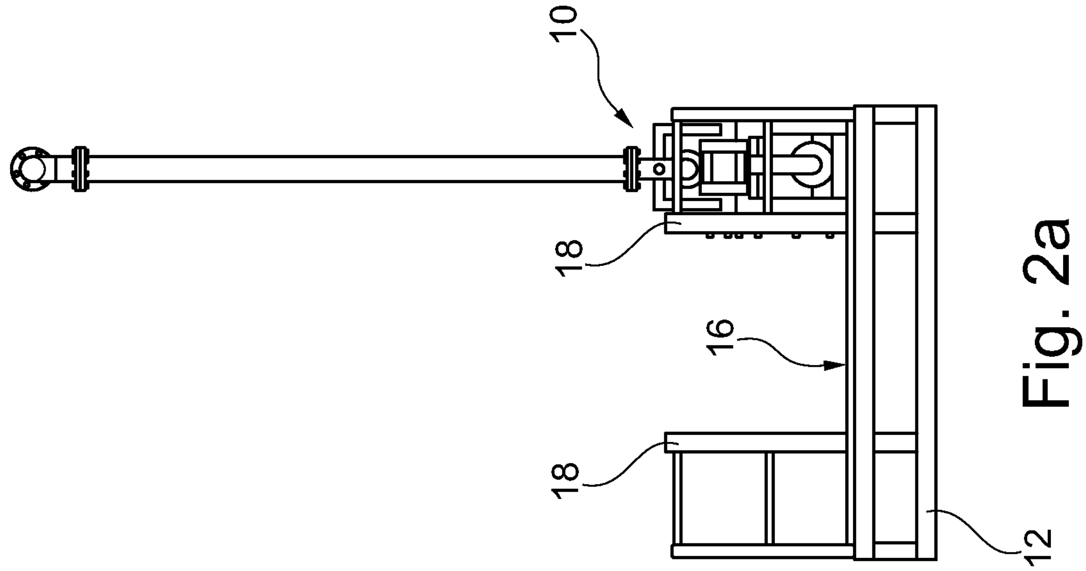
Figure 3:
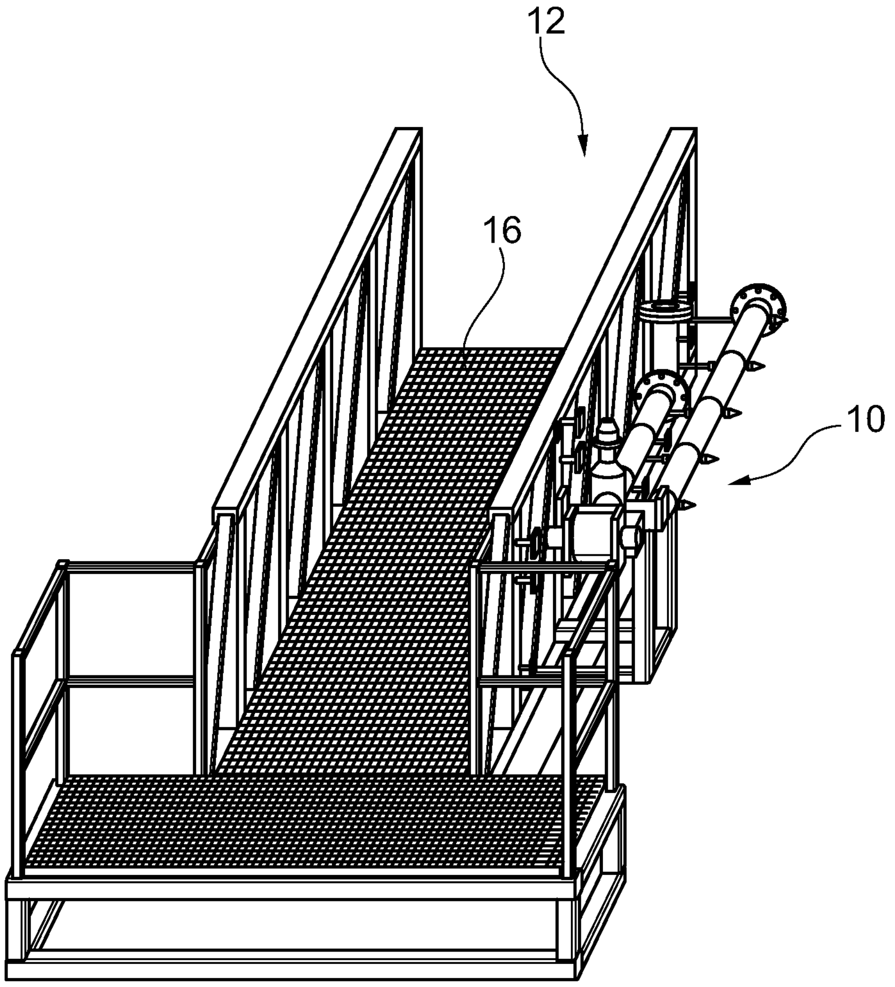

A first positional option is shown in FIGS. 2*a* and 2*b* where the deluge system 10 is provided outboard of boom handrails 18. The walkway 16 is thus completely clear for access for personnel. FIG. 3 shows the deluge system 10 in this outboard and stowed position. This contrasts sharply with existing systems which are provided over both handrails and so block the use of the walkway.

Figure 4B:
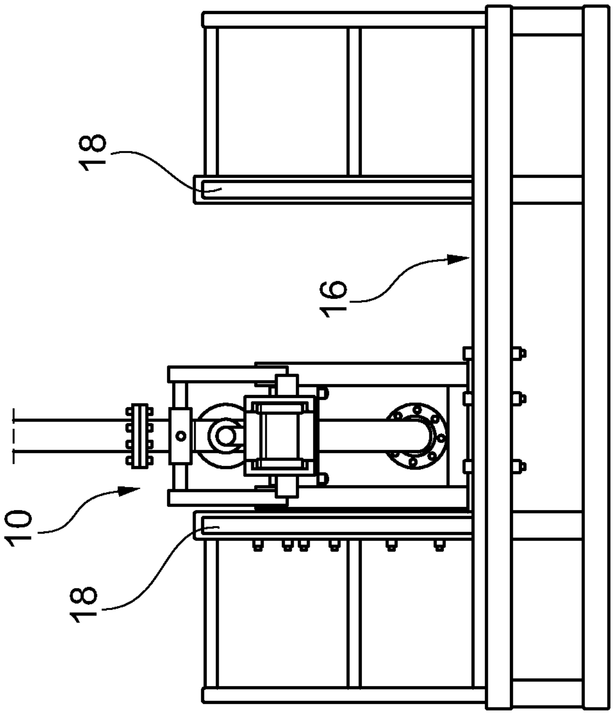
Figure 4A:
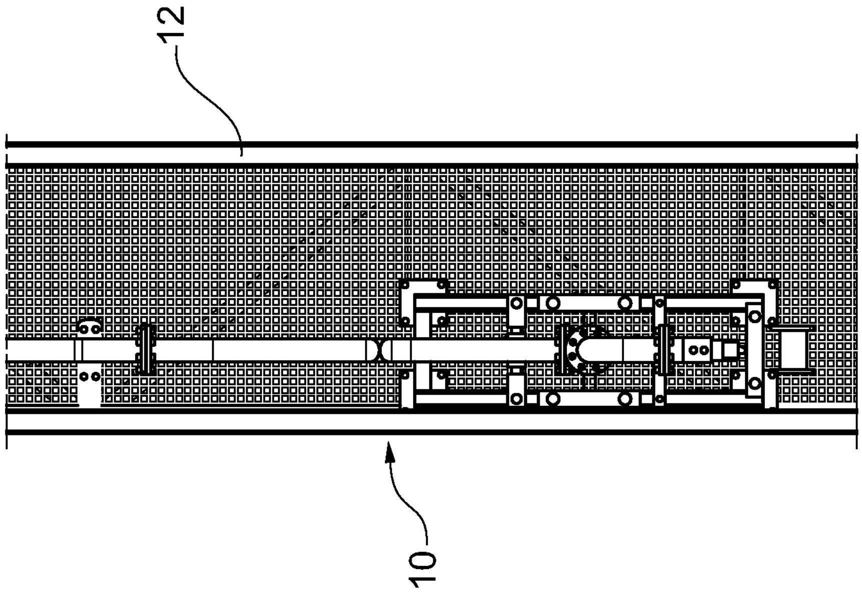

A second positional option is shown in FIGS. 4*a* and 4*b* where the deluge system 10 is provided inboard of the handrails 18 and clamped to the side thereof. Whilst some space on the boom walkway 16 is taken up by the deluge system 10 there is still sufficient space on the walkway 16 to allow personnel to access the entire boom and escape therefrom in an emergency.

Such a position can be beneficial for installations that have their own booms installed as they tend to be wider than temporarily installed flare booms.

Figure 5B:
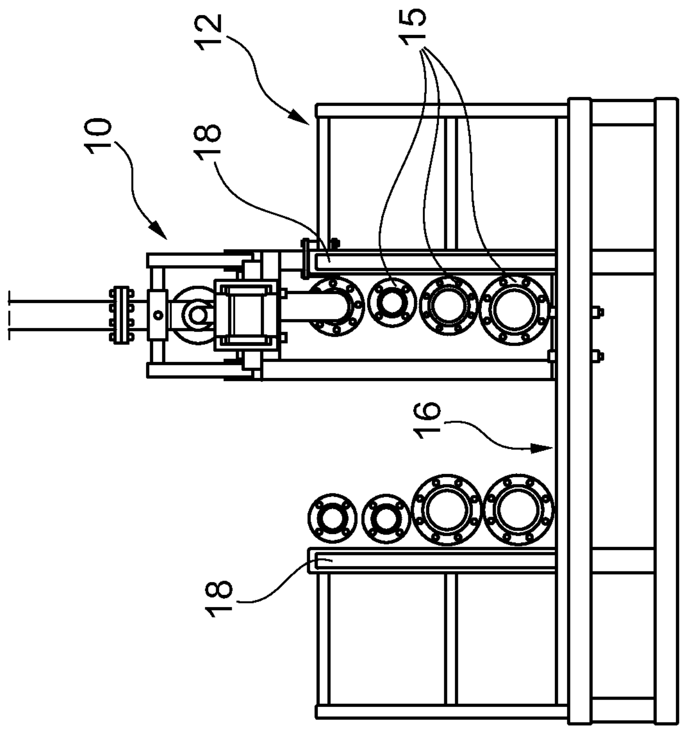
Figure 5A:
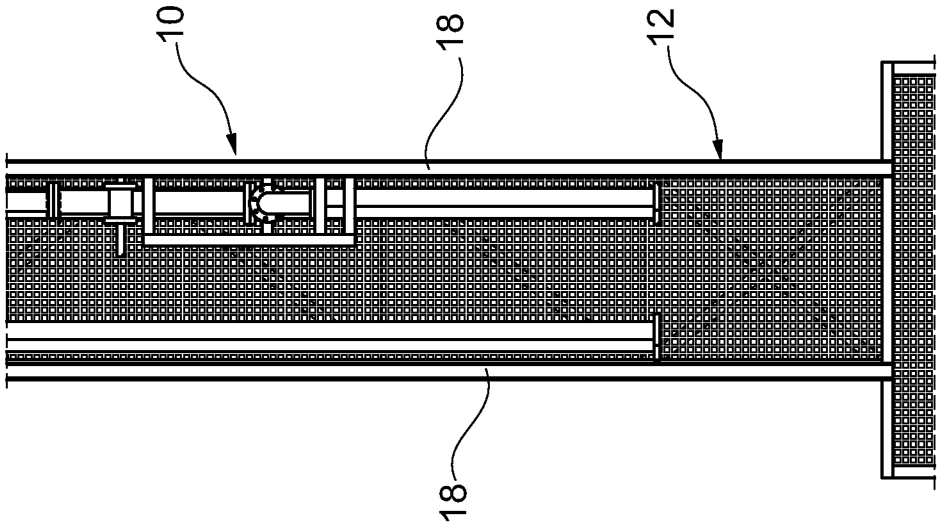

A further positional option for the deluge system 10 is shown in FIGS. 5*a* and 5*b*. This position is inboard of the boom handrails 18 but over pipework 15 often present in booms 12, thus making minimal difference to the accessible area of the walkway 16; and so still allowing access for personnel.

Figure 6:
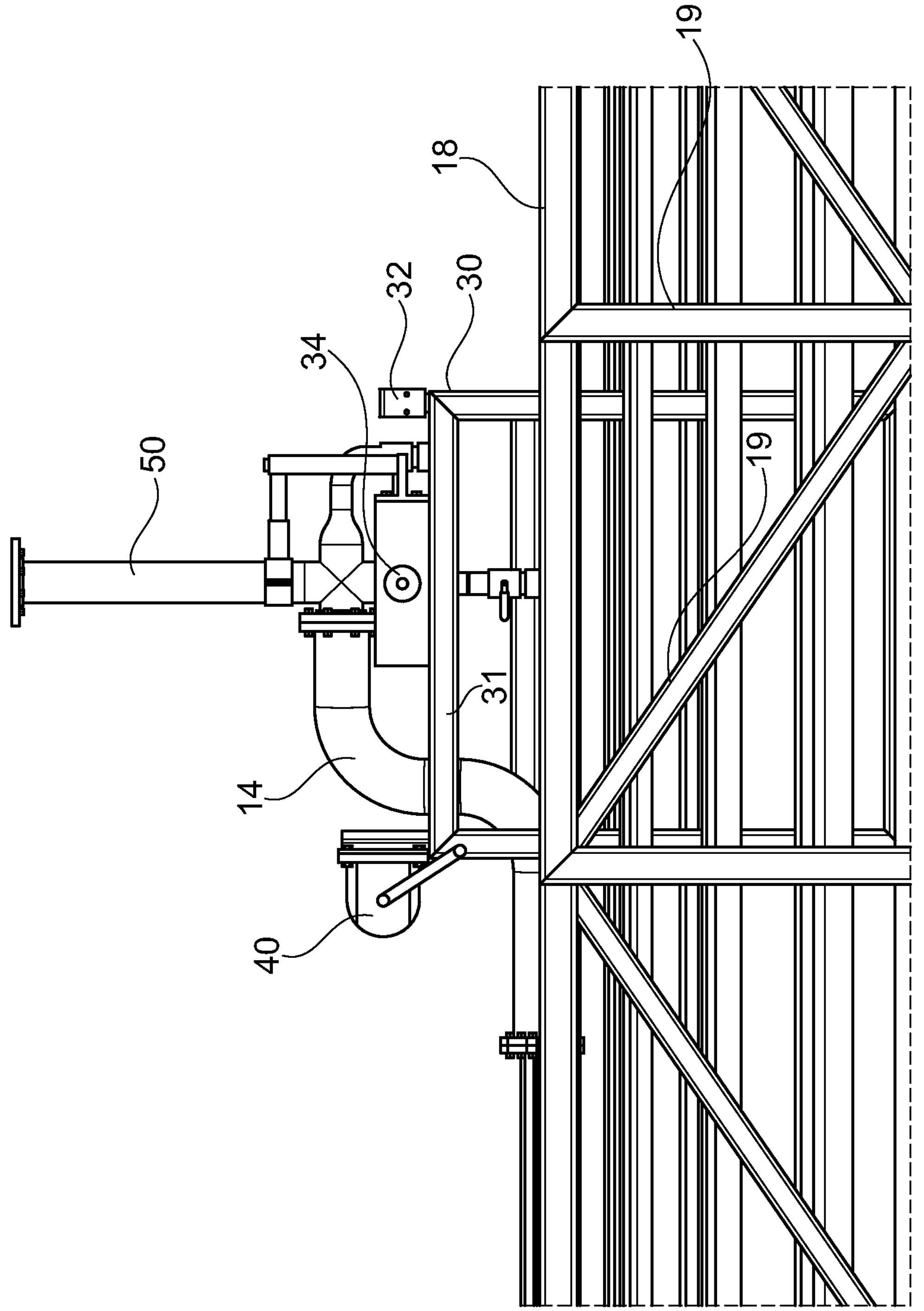
FIG. 6 is a side view of a lower end of the FIG. 1 deluge system in an operative position and a flare boom.

As shown in FIG. 6, the deluge system 10 comprises a base unit 30, a winch 40 and a main body 50. The base unit 30 comprises a frame 31 which is clamped to the handrails 18 and their supports 19.

The winch 40 is attached to the base unit 30 and controls a line 42 (not shown in FIG. 6) which extends to the opposite end of the stanchion 20 in order to move the main body 50, stanchion 20 and nozzle apparatus 22 as described in more detail below.

This contrasts with existing systems where the installation's crane needs to raise the system and typically position a 4" flange to another 4" flange while lifting the assembly over the boom and above workers who must guide the assembly down and connect it. This is a very dangerous activity which embodiments of the present invention including the winch avoid or mitigate.

Moreover, given the crane on the installation can only pull towards the installation, any previous deluge system needs to be orientated so that it moves upwards towards the installation. For larger stanchions the resulting operational position is often spaced away from the well flaring by a greater distance than desired. In contrast, the embodiments of the present invention comprising a winch 40 or gearing system described below may be orientated, if required, such that they move upwards away from the installation and so their final operational position allows the water screen operation to be optimally positioned form the well flaring.

To allow for the main body 50 to move, a swivel unit 34 has a moving mechanism comprising (not shown) nylon brushes and washers (alternatively on roller bearings) and optionally a gearing system. Better shown in FIG. 7, the swivel unit 34 is connected to swivel clamps 36 which are attached to the main body 50.

The main body 50 includes containers or "debris traps" 51, 52. Within the main body is a screen which inhibits debris in the water supply from going up the stanchion 20 towards the nozzle. The debris traps 51, 52 provide a recess for the debris to collect (rather than on the screen).

Figure 7:
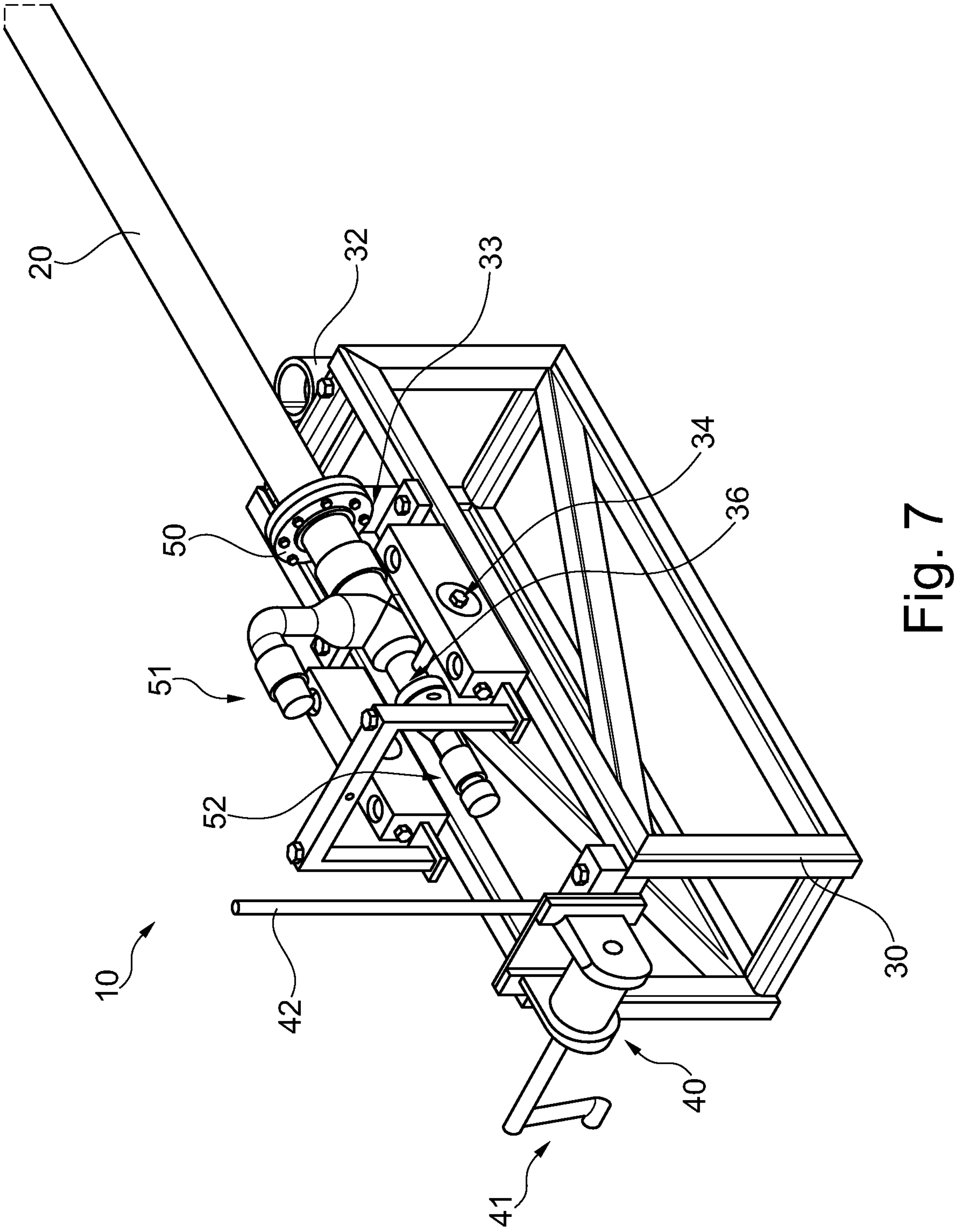
FIG. 7 is a perspective view of the FIG. 1 deluge system.

Some further details are shown in FIG. 7 including a removable winch handle 41, a further pipe support 33.

The series of views from FIGS. 8*a* to 8*e* show the deluge system 10 moving from the stowed position (FIG. 8*a*), the stowed position with the nozzle apparatus 12 attached (FIG. 8*b*) and approaching the operational position (FIG. 8*e*). Typically the deluge system 10 is installed onshore in the position shown in FIG. 8*a* ready for shipping. The nozzle apparatus 22 is installed on location (FIG. 8*b*) and then the stanchion 20, nozzle apparatus 22 and main body 50 erected into the operational position by the internal winch or gearing with a handle. When the system is the operational position, it is secured and the 4" flexible pipework 14 is attached to the main body 50. The winch also allows convenient stowing of the system when not in use, without requiring specialist personnel and use of the installation's crane. This also removes the dangerous operation of swinging the boom towards the rig in order to allow access for the installation's crane.

FIG. 9 shows a further view of a deluge system in accordance with the present invention. FIG. 10 shows a modified embodiment 110 where a handle 135 is attached to the swivel unit 134. The swivel unit 134 includes a gearing system (not shown) and so an operator can use the handle to erect the stanchion 20 and associated nozzle apparatus.

FIG. 11 shows one embodiment of an alternate deluge system 210 provided in a stowed position on a boom 212 of an offshore platform (not shown). The deluge system 210 comprises a mechanism connection or bracket 230 connected to a moveable member 221. The moveable member 221 comprises a stanchion tube 220, nozzle apparatus 222 and a counterweight 223. A further clamp 232 holds the moveable member in the stowed position and can be released before the stanchion is raised.

As will be described in more detail below, the moveable member 221 moves around a connection point (i.e. a point with the connection bracket 230 where it can rotate or part-rotate around) so that it moves to an operative position, shown in FIG. 12, and is then secured by ropes 227. The deluge system 210 then takes water supplied by pumps (not shown) through pipework 214, hose 217, through the stanchion 220 into the nozzle apparatus 222 to create a screen of water, thus mitigating the heat transfer from a well flaring operation at the end of the boom 212.

This moving operation is much easier because of the position of the connection point (it is not at the end of the moveable member) and the counterweight 223, at the end of the moveable member opposite the nozzle apparatus 222.

An enlarged view of the connection bracket 230 and a counterweight end of the moveable member 221 in an upright position is shown in FIG. 13. The bracket 230 is secured to sides/handrail supports 216 of the boom 212. The moveable member is attached to the bracket at a connection point 231. Thus the moveable member and connection bracket are both outboard of the handrails 216 of the boom 212. This contrasts sharply with existing systems which are provided over both handrails and so block the use of the walkway. Notably a deluge system provided in accordance with this embodiment of the invention, leaves the walkway completely clear for access for personnel, especially in an emergency situation when the walkway needs to be cleared of personnel quickly to escape a dangerous situation.

Weights 225 are attached to the counterweight end for aiding the erection of the stanchion 220. A fluid connector 226 is provided which is connected to a water supply and leads to a fluid passage within the stanchion 220. A debris trap 240 is also provided to collect debris in the water supply. To become operative therefore, the platform's water supply 214 (shown in FIG. 12) is connected to the fluid connector 226 via a hose 217. Note, for certain embodiments, additional weights 225 need not be added and the deluge system can still function and benefit from the counterweight effect of the end of the moveable member (since the connection point is spaced away from the end of the moveable member.)

When moving the moveable member 221 from the stowed position (FIG. 11) to the operative position (FIG. 12) the position of the rotating point 231 and the counterweight allows a very modest force to be applied to move the moveable member, and so position the stanchion 220 in the operative position. Thus for certain embodiments, an platform's cranes or a stand-alone winching system may not be required to move the stanchion 220 and nozzle apparatus 222 to the operative position. Due to the limitations of the platform's winches (e.g. it can only pull towards the platform) the deluge system 210 can be more optimally positioned on the boom 212 than was possible in certain situations for known systems.

A great benefit of embodiments of the invention is that the operation and raising of the stanchion if a deluge apparatus is greatly simplified. Moreover a further benefit is that the operation is safer.

FIGS. 14*a*-14*b* are a series of views of the boom 212 with the deluge system attached thereto. As can be seen in particular from the plan (FIG. 14*b*) and end (FIG. 14*c*) views, a walkway 219, shown in FIGS. 14*c* and 14*d*, are clear for workers and the deluge system 210 does not block access to this walkway. Moreover, as can be seen from FIG. 14*d*, the deluge system can move from a front to a back storage position, as required.

This can further assist in operation of the deluge system. Ideally the nozzle apparatus 222 is attached on location. This is much easier and less hazardous to do when the nozzle apparatus 222 is facing in the upwards direction. Thus the moveable member 221 can be appropriately positioned in a horizontal position so that the nozzle apparatus 222 can be attached in such a position. It can also be easier to raise the moveable member 221 when the heavy nozzle apparatus 222 is in such an upwardly facing position, as the effective weight at the connection point is less, compared to when the nozzle apparatus 222 is facing downwards.

Moreover, when not in use, it is better to store the nozzle in a downwards position, where it is less likely to become damaged, and also so that it can be positioned below the boom handrail 216. Thus the moveable member can be rotated to be stowed in a position or about 180 degrees to the position where the nozzle was attached.

FIGS. 15 to 19 show an alternative embodiment of deluge system 310 in accordance with one aspect of the invention. It includes a split base unit 330 which can rotate 360 degrees vertically in order to move from the stowed position to an operative position, and 360 degrees horizontally in order to move from a transit position to stowed positions. The stanchion 320 can be any length.

As shown in FIG. 15 the base unit is attached to one handrail support of the boom 312 and shipped in the position shown, with the stanchion 320 and other components over the walkway in order to reduce dropped-object hazards (notably this is not the position in which it should be used.) The nozzle apparatus 322 is normally attached onsite and not shipped assembled.

FIG. 16 shows a "stowed" position. The stanchion 320 has been swung around horizontally, compared to the FIG. 15 position, so that it extends outboard of the handrails, and the nozzle apparatus 322 attached. An alternative stowed position is shown in FIG. 17, which is also outboard of the handrails, and can be positioned in this way by 180 degree rotation of the stanchion 320 and associated components, from the position shown in FIG. 16. This may be done in either rotational direction. For example if there is anything blocking the overhead route, the stanchion 320 may be rotated 180 degrees such that the nozzle extends downwards relative to the boom 312 and around from the FIG. 16 to the FIG. 17 position.

FIG. 18 shows the deluge system 310 in an operative position, leaving the walkway clear of obstacles. FIG. 19 shows a yet further position of the deluge system, where it has been rotated vertically and horizontally and can take on the shown position which is useful for servicing.

In preferred embodiments, the deluge system is positioned outwith the flare boom walkway on a single handrail or attached to the handrail supports.

An advantage of certain embodiments is that the deluge may have its own mechanism, e.g. a winch or counter weight, for moving the stanchion from the stowed position to the operational position avoiding the risk of being struck by crane operations when it is not in use.

Improvements and modifications may be made without departing from the scope of the invention.

The invention claimed is:

1. A method of operating a deluge system on a burner boom including pipework, a vertical handrail, and a horizontal walkway, the deluge system comprising a base unit and a stanchion including a nozzle at a distal end thereof, wherein the stanchion is moveable relative to the burner boom from a stowed fixed position to an operative fixed position, the method comprising:

using a counterweight operatively coupled to the stanchion to ease repositioning of the stanchion between the stowed fixed position, where the stanchion predominantly occupies a horizontal position, and the operative fixed position, where stanchion predominantly occupies a vertical position and the nozzle is elevated above the handrail during at least a portion of a well-flaring operation;

directing water through the stanchion and exiting the nozzle during the well-flaring operation, where the nozzle is configured to shape a screen of water between a heat source and the stanchion to mitigate heat transfer from the heat source;

supplying at least one of oil and gas through the pipework; and generating the heat source by conducting the well-flaring operation that combusts at least one of the oil and the gas exiting the pipework.

2. A method of claim 1, wherein:

when the stanchion is in the stowed fixed position, the stanchion has a dominant longitudinal dimension in line with the walkway; and, when the stanchion is in the operative fixed position, the stanchion has a dominant longitudinal dimension not in line with the walkway.

3. The method of claim 1, wherein:

repositioning the stanchion between the stowed fixed position and the operative fixed position includes rotating the stanchion about at least two axes perpendicular to one another, at least one of the at least two axes is oblique with respect to an axis parallel to a dominant longitudinal dimension of the walkway.

4. The method of claim 1, wherein:

repositioning the stanchion between the stowed fixed position and the operative fixed position includes rotating the stanchion about a first axis perpendicular to a second axis parallel to a dominant longitudinal dimension of the walkway.

5. The method of claim 1, wherein the stanchion is outboard of the vertical handrail both in the stowed fixed position and in the operative fixed position.

6. The method of claim 1, wherein the stanchion is repositionably coupled to the vertical handrail.

7. The method of claim 1, wherein the stanchion is moveable in an upwards direction relative to the burner boom.

8. The method of claim 1, wherein the operative fixed position is fully upright.

* * * * *